W. E. PHINNEY.
ARTIFICIAL BAIT.
APPLICATION FILED APR. 20, 1916.
1,209,022.
Patented Dec. 19, 1916.
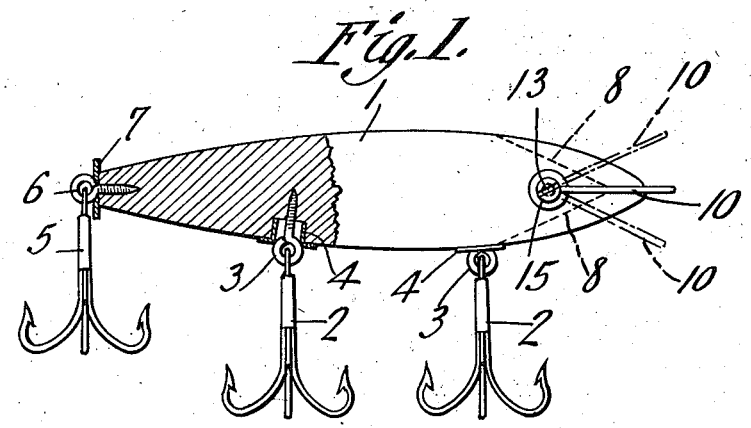
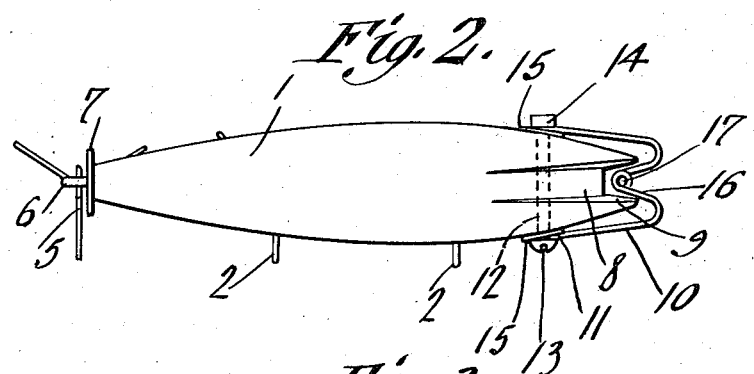
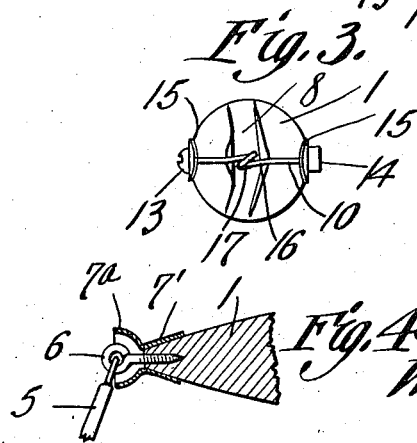
W. E. Phinney
Inventor
Witnesses
by C. A. Snow & Co.
Attorneys

UNITED STATES PATENT OFFICE.

WILLIS E. PHINNEY, OF COLDWATER, MICHIGAN.

ARTIFICIAL BAIT.

1,209,022.  Specification of Letters Patent.  Patented Dec. 19, 1916.

Application filed April 20, 1916. Serial No. 92,475.

*To all whom it may concern:*

Be it known that I, WILLIS E. PHINNEY, a citizen of the United States, residing at Coldwater, in the county of Branch and State of Michigan, have invented a new and useful Artificial Bait, of which the following is a specification.

The present invention appertains to artificial baits, and aims to provide a novel and improved artificial bait for attracting and catching or snagging fish.

It is the object of the invention to provide an artificial bait having novel means for the attachment of the line thereto, and novel means coöperable with said line attaching means, whereby the bait can be made to dive to different depths in the water when it is pulled by the line, or can be made to skip and jump upon the surface of the water, the bait when drawn through the water having a zig-zagged course to produce a wabbling motion of the bait.

It is also within the scope of the invention to provide an artificial fishing bait having the characteristics above noted, and which is comparatively simple and inexpensive in construction, as well as being thoroughly practical and efficacious in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of the improved bait. Fig. 2 is a plan view thereof. Fig. 3 is a front end view of the bait. Fig. 4 is a sectional detail illustrating a modification.

The bait embodies a body 1 constructed of wood or other buoyant material, and of fusiform or other suitable contour. Hung from the body 1 between the ends thereof are hooks 2, which have their eyes loosely engaging screw eyes 3 threaded into the body 1 and disposed within sheet metal rings 4 to protect the body 1 from wear, and to limit the swinging movements of the hooks. A tail hook 5 has its eye loosely engaging a screw eye 6 threaded into the rear end of the body 1, and a washer 7 is preferably disposed upon the shank of the screw eye 6 between the head of said eye and the body 1, to prevent the hook 5 from swinging forwardly to such an extent that its points can engage the body. This prevents the hook from marring the body, the surface of said body being finished in any suitable manner to lure the fish. Treble hooks are preferably used, although any other suitable means can be carried by the body for snagging or catching the fish which attempts to bite or swallow the bait.

The forward end portion of the body 1 is provided with upper and lower channels 8 between the sides thereof, and diverging rearwardly, the rear ends of said channels merging or vanishing into the upper and lower surfaces of the body 1 between the ends thereof, but nearer the forward end than the rear end. Thus, the forward ends of the channels 8 are relatively deep, while the rear ends thereof are shallow and blend into the surface of the body. Said channels provide inclined surfaces, one of which faces upwardly and the other of which faces downwardly, and said channels provide a notch or recess 9 in the forward end of the body. As seen in Figs. 2 and 3, the channels 8 are disposed obliquely, so as to extend from the forward end of the body toward one side thereof at a slight angle, to create a wabbling or zig-zag motion of the bait when drawn through the water, as will hereinafter more fully appear.

In order to attach the line (not shown) to the body 1, a wire bail or attaching member 10 is used, the ends thereof having eyes 11 pivotally engaging the terminals of a bolt 12 engaged transversely through the body 1 between the channels 8 adjacent the forward end of the body. One end of the bolt 12 has a head 13 for the engagement of a screw driver, and a nut 14 is threaded upon the other end of the bolt. Washers 15 are preferably provided upon the bolt to seat against the sides of the body 1, and the eyes 11 are disposed between the washers 15 and the head 13 and nut 14, respectively. The terminals of the bail 10 are thus pivotally connected with the opposite sides of the body, whereby the bail 10 can be swung upwardly and downwardly upon a transverse axis, when the bolt 12 is loosened, and when the bolt is tightened, said bail will be held in its adjusted position. The free portion or bend of the bail 10 has a reëntrant or rearwardly projecting loop or bend 16 provided with a coil or eye 17 for the attachment of the line, said coil or eye 17 lying within the notch 9 close to the edge between the forward ends of the inclined surfaces provided by the channels 8. The bail 10 projects forwardly, and the eye or coil 17 being offset rearwardly brings the point of attachment of the line as near the body as possible, and slightly behind the forward end of the body.

In use, when the bail 10 is in intermediate position in a plane in which the axis of the body 1 lies, the bait can be drawn through the water in the ordinary manner, the tendencies for the bait to dive and jump or skip being neutralized. When the bail 10 is adjusted upwardly, the bait in being drawn through the water, will be made to dive, due to the fact that the upper channel or inclined surface 8 has a greater impact of water thereagainst than the lower channel or surface 8, whereby the upper channel 8 in moving against the water, will move the bait downwardly. The depth to which the bait dives depends upon the speed at which the bait is drawn through the water, and also depends upon the angle to which the bail 10 is adjusted relative to the body 1, as will be apparent. The bait can be made to skip or jump on the surface of the water by adjusting the bail 10 downwardly from its intermediate or neutral position, whereby the action of the lower channel or surface 8 against the water will cause the bait, when drawn over the water, to have a skipping action, depending upon the angle at which the bail 10 is arranged relative to the body. Due to the arrangement of the coil or eye 17 close to the inclined surfaces 8, the diving or skipping action of the bait is made very effective. The water in flowing through the channels 8 will move obliquely relative to the bait, and thus as the bait is drawn through the water, the action of the water within the channels 8, will shift the bait laterally to one side, but the pull of the line will tend to restore the bait to normal position, thus giving the bait a wabbling or zigzagged motion, to simulate the movements of a live bait when being pursued by a larger fish.

The present bait can be used for catching various fish.

Fig. 4 illustrates a modified means for preventing the tail hook 5 from swinging against the body 1. Thus, a tapered ferrule 7' is fitted upon the rear end of the body 1, and is provided with a flared portion 7ª in which the screw eye 6 is arranged, and preventing the hook 5 from swinging forwardly beyond a certain point.

Having thus described the invention, what is claimed as new is:

1. An artificial bait embodying a body having upper and lower diverging surfaces at its forward end, and vertically adjustable line attaching means carried by the forward end of the body.

2. An artificial bait embodying a body having an inclined surface, and a line attaching member pivoted to said body near said surface and adjustable vertically.

3. An artificial bait embodying a body having upper and lower diverging surfaces at its forward end, and a line attaching member pivoted to the body adjacent its forward end and adjustable upwardly and downwardly.

4. An artificial bait embodying a body having an inclined surface, and a bail terminally pivoted to the body near said surface and having a line attaching means at its free portion.

5. An artificial bait embodying a body having upper and lower diverging surfaces at its forward end, and a bail terminally pivoted to the sides of the body adjacent its forward end and provided at its intermediate portion with line attaching means.

6. An artificial bait embodying a body having upper and lower diverging surfaces at its forward end, a transverse bolt engaged through the body between said surfaces, and a forwardly projecting bail having its terminals pivotally embracing the ends of said bolt, the intermediate portion of said bail having a line attaching eye.

7. An artificial bait body having upper and lower diverging channels extending from its forward end obliquely toward one side.

8. An artificial bait embodying a body having upper and lower diverging channels extending from its forward end, and vertically adjustable line attaching means carried by the body adjacent its forward end.

9. An artificial bait embodying a body having an inclined channel, and vertically adjustable line attaching means carried by the body near said channel.

10. An artificial bait embodying a body having an inclined channel, and a line attaching member pivotally connected with the body near said channel.

11. An artificial bait embodying a body having upper and lower diverging channels extending from its forward end, and a line attaching member pivoted to the body near its forward end.

12. An artificial bait embodying a body having an inclined channel, and a bail terminally pivoted to the body near said channel and having line attaching means intermediate its ends.

13. An artificial bait embodying a body having upper and lower inclined channels extending from its forward end, and a line attaching bail having its terminals pivoted to the sides of the body and provided between its ends with a line attaching eye.

14. An artificial bait embodying a body having upper and lower inclined diverging channels extending from its forward end and providing a notch in the forward end of the body, and a bail having its terminals pivotally connected with the sides of the body near the forward end thereof, the bail projecting forwardly and having a reëntrant portion between its ends projecting into said notch, and provided with a line attaching eye.

15. An artificial bait embodying a body having upper and lower inclined diverging channels extending from its forward end, said channels extending obliquely from the forward end of the body toward one side thereof, and a line attaching bail having its terminals pivotally connected with the sides of the body, said bail projecting forwardly and having a line attaching means between its ends.

In testimony that I claim the foregoing as my own, I have hereto affixed my signature in the presence of two witnesses.

WILLIS E. PHINNEY.

Witnesses:
D. C. ALLEN,
GEO. W. COLLINS.